United States Patent
Itou

(10) Patent No.: US 8,670,311 B2
(45) Date of Patent: Mar. 11, 2014

(54) MONITORING MANAGEMENT APPARATUS, MONITORING MANAGEMENT METHOD, AND DEVICE RECORDING MONITORING MANAGEMENT PROGRAM

(75) Inventor: Toshihiro Itou, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 132 days.

(21) Appl. No.: 13/326,987

(22) Filed: Dec. 15, 2011

(65) Prior Publication Data

US 2012/0155278 A1 Jun. 21, 2012

(30) Foreign Application Priority Data

Dec. 20, 2010 (JP) ................. P2010-283215

(51) Int. Cl.
*H04L 12/28* (2006.01)
*H04W 72/00* (2009.01)

(52) U.S. Cl.
USPC ........ 370/230; 370/235; 370/400; 455/435.1; 455/450; 455/455

(58) Field of Classification Search
USPC ......... 370/229–231, 235, 328, 329, 400, 401; 455/435.1–435.3, 450–453, 455
See application file for complete search history.

(56) References Cited

U.S. PATENT DOCUMENTS

| | | | | |
|---|---|---|---|---|
| 4,415,771 | A * | 11/1983 | Martinez | 455/102 |
| 2006/0291408 | A1 | 12/2006 | Huang et al. | |
| 2007/0275690 | A1* | 11/2007 | Hunter et al. | 455/404.2 |
| 2008/0194245 | A1* | 8/2008 | Leuca et al. | 455/419 |
| 2008/0214140 | A1* | 9/2008 | Caveney et al. | 455/402 |
| 2008/0232402 | A1* | 9/2008 | Higuchi et al. | 370/469 |
| 2011/0059718 | A1* | 3/2011 | Wang et al. | 455/404.1 |
| 2011/0255528 | A1 | 10/2011 | Zakrzewski | |

FOREIGN PATENT DOCUMENTS

JP  2009-260451 A  11/2009
WO  2006038163 A1  4/2006

OTHER PUBLICATIONS

European Search Report dated May 2, 2012 of the corresponding European Patent Application No. EP11193832.0.
Jian-Ming Liao et al., "Study on Wireless Hart Network Layer", Apperceiving Computing and Intelligence Analysis (ICACIA), 2010 International Conference on, IEEE, Dec. 17, 2010, pp. 187-189, XP031901488.
Haitao Xiao et al., "A Distributed Localized Decision Self-Health Monitoring System in WSN Developed for Bridge Diagnoses", Communication Software and Networks (ICCSN), 2001 IEEE 3rd International Conference on, IEEE, May 27, 2011, pp. 23-28, XP032049750.

* cited by examiner

*Primary Examiner* — Kerri Rose
(74) *Attorney, Agent, or Firm* — Sughrue Mion, PLLC

(57) ABSTRACT

A monitoring management apparatus may include a storage unit that stores connection information indicating a connection state of the wireless device connected to the communication system, a display unit that displays the wireless device connected to the communication system based on the connection information stored in the storage unit, an input unit that receives an instruction related to the wireless device displayed on the display unit, and a control unit that performs control of temporarily interrupting communication of a wireless device, other than a wireless device satisfying conditions set in advance, with reference to the connection information stored in the storage unit when a simultaneous interruption instruction to simultaneously interrupt communication of a wireless device is input to the input unit.

20 Claims, 10 Drawing Sheets

FIG. 4A

| PARAMETER | DESCRIPTION |
|---|---|
| ServiceType | TYPE OF COMMUNICATION (PERIODIC COMMUNICATION/NON-PERIODIC COMMUNICATION) |
| ActivationTime | ACTIVATION TIME OF SESSION |
| SourceDevice | DEVICE NAME OF TRANSMISSION SOURCE OF SESSION |
| SourceSAP | PROCESS NAME OF TRANSMISSION SOURCE OF SESSION |
| DestinationDevice | DEVICE NAME OF TRANSMISSION DESTINATION OF SESSION |
| DestinationSAP | PROCESS NAME OF TRANSMISSION DESTINATION OF SESSION |
| ExpirationTime | EXPIRATION TIME OF SESSION |
| Priority | PRIORITY OF SESSION |
| NSDUSize | SIZE OF NSDU |

FIG. 4B

| PARAMETER | DESCRIPTION |
|---|---|
| DeviceName | DEVICE NAME OF WIRELESS DEVICE |
| Role | ROLE SET IN WIRELESS DEVICE |
| VendorName | VENDOR OF WIRELESS DEVICE |
| ModelName | MODEL NAME OF WIRELESS DEVICE |

MONITORING MANAGEMENT APPARATUS, MONITORING MANAGEMENT METHOD, AND DEVICE RECORDING MONITORING MANAGEMENT PROGRAM

BACKGROUND OF THE INVENTION

1. Field of the Invention

The present invention relates to a monitoring management apparatus that performs monitoring and management of a communication system to which wireless devices are connected, a monitoring management method, and a computer-readable device storing a monitoring management program.

Priority is claimed on Japanese Patent Application No. 2010-283215, filed Dec. 20, 2010, the content of which is incorporated herein by reference.

2. Description of the Related Art

All patents, patent applications, patent publications, scientific articles, and the like, which will hereinafter be cited or identified in the present application, will hereby be incorporated by reference in their entirety in order to describe more fully the state of the art to which the present invention pertains.

A field device, which is a kind of a wireless device, includes a sensor device such as a flowmeter or a temperature sensor, a valve device such as a flow control valve or an on-off valve, an actuator device such as a fan or a motor, and other devices installed in a plant or a factory. Most conventional field devices transmit/receive various signals such as measurement signals or control signals via wired field buses installed in a plant or the like. In recent years, wireless field devices that transmit/receive various signals in a wireless manner according to an industrial wireless communication standard such as ISA100.11a or Wireless HART have been realized.

The wireless communication standard ISA100.11a is an industrial automation wireless communication standard established by the International Society of Automation (ISA). The Wireless HART is a wireless communication standard proposed by the Highway Addressable Remote Transducer (HART) Communication Foundation of the USA. Since wireless field devices conforming to the wireless communication standards can perform wireless communication, it is possible to facilitate installation and the like at places where wiring of a wired field bus is difficult or wiring construction is not economical.

A communication system conforming to the wireless communication standard ISA100.11a mainly includes a wireless device, a gateway, a system manager, and a monitoring management apparatus. The wireless device includes the above-mentioned wireless field device and the like, and transmits/receives a wireless packet to/from the gateway. The gateway connects a wired network, to which the system manager is connected, to a wireless network to which the wireless device is connected, and relays a packet transmitted/received between the system manager and the wireless device.

The system manager integrally manages the communication system by performing management and the like of various types of information necessary for communicating with the wireless device. The monitoring management apparatus is manipulated by a manager of the communication system, and performs display and the like of the various types of information managed by the system manager while performing various settings corresponding to an instruction of the manager with respect to the system manager. Japanese Unexamined Patent Application, First Publication No. 2009-260451 discloses a communication system in which sensor nodes for measuring a physical amount such as temperature or a flow rate are connected to a monitoring system for monitoring these sensor nodes via a gateway node.

In general, in a communication system installed in a plant and the like, wireless communication paths are established between a gateway and a plurality of wireless devices, so that communication is performed between the gateway and the plurality of wireless devices. At the time of a test or emergency of the communication system, communication between wireless devices other than a specific wireless device, and a gateway is interrupted, so that a priority may be given to communication of the specific wireless device.

For example, a connection confirmation test when a wireless network of a communication system is constructed or a test for confirming whether a packet received in a wireless device is accurately managed is performed in the state in which communication by wireless devices, other than by a wireless device to be tested, has been interrupted. Furthermore, at the time of an emergency such as natural disaster, it is necessary to quickly perform communication with a high priority even when communication with a low priority is interrupted. The communication with a high priority, for example, includes transmission of control data for performing the opening and closing and the like of a valve. If exchange of wireless devices is performed, communication by wireless devices, other than by a wireless device to be exchanged, is interrupted.

Communication between the gateway and the wireless devices is interrupted by the system manager if a manager manipulates the monitoring management apparatus to select one wireless device and gives an instruction to interrupt communication of the selected wireless device. However, in order to interrupt communication by wireless devices, other than by a specific wireless device, since it is necessary for the manager to give the above instruction to all wireless devices, other than the specific wireless device, much effort and time are required and it is difficult to cope with an emergency situation. Furthermore, since efforts for indicating wireless devices whose communication is to be interrupted, have increased as the size of a communication system has increased, it is highly probable for an erroneous operation to occur.

SUMMARY

The present invention provides a monitoring management apparatus, and a computer-readable recording medium having recorded a monitoring management program capable of quickly interrupting communication by wireless devices, other than by a specific wireless device, through very easy manipulation.

A monitoring management apparatus performs monitoring and management of a communication system to which a plurality of wireless devices are connected. The monitoring management apparatus may include: a storage unit that stores connection information indicating a connection state of the wireless device connected to the communication system; a display unit that displays the wireless device connected to the communication system based on the connection information stored in the storage unit; an input unit that receives an instruction related to the wireless device displayed on the display unit; and a control unit that performs control of temporarily interrupting communication of a wireless device, other than a wireless device satisfying conditions set in advance, with reference to the connection information stored in the storage unit when a simultaneous interruption instruction to simultaneously interrupt communication of a wireless device is input to the input unit.

The control unit may perform control of temporarily interrupting communication of a wireless device, other than a specified wireless device based on an instruction input to the input unit before the simultaneous interruption instruction is input, among the wireless devices connected to the communication system.

When a communication path of the specified wireless device based on the instruction input to the input unit has been established via another wireless device, the control unit may perform control of temporarily interrupting communication of a wireless device other than the specified wireless device and the other wireless device.

A priority may have been set for each of the plurality of wireless devices, and the control unit may perform control of temporarily interrupting communication of a wireless device with a priority lower than a priority set based on the instruction input to the input unit.

The storage unit may further store information related to a wireless device and data transmitted between the wireless device and a system manager.

The control unit may search for a communication path of the wireless device with reference to the connection information, which has been stored in the storage unit and indicates the connection state of the wireless device connected to the communication system, and the information related to the wireless device.

A monitoring management method performs monitoring and management of a communication system to which a plurality of wireless devices are connected. The monitoring management method may include: storing connection information indicating a connection state of the wireless device connected to the communication system; displaying the wireless device connected to the communication system based on the connection information that has been stored; receiving an instruction related to the wireless device that has been displayed; and performing control of temporarily interrupting communication of a wireless device, other than a wireless device satisfying conditions set in advance, with reference to the connection information, which has been stored, when a simultaneous interruption instruction to simultaneously interrupt communication of a wireless device is input.

The monitoring management method may further include: performing control of temporarily interrupting communication of a wireless device, other than a specified wireless device based on an instruction that has been input before the simultaneous interruption instruction is input, among the wireless devices connected to the communication system.

The monitoring management method may further include: performing control of temporarily interrupting communication of a wireless device other than the specified wireless device and the other wireless device when a communication path of the specified wireless device based on the instruction, which has been input, has been established via another wireless device.

A priority may have been set for each of the plurality of wireless devices, and the monitoring management method may further include: performing control of temporarily interrupting communication of a wireless device with a priority lower than a priority set based on the instruction that has been input.

The monitoring management method may further include: storing information related to a wireless device and data transmitted between the wireless device and a system manager.

The monitoring management method may further include: searching for a communication path of the wireless device with reference to the connection information, which has been stored and indicates the connection state of the wireless device connected to the communication system, and the information related to the wireless device.

A computer-readable device storing a monitoring management program for causing monitoring and management of a communication system to be performed by a computer, a plurality of wireless devices being connected to the communication system, wherein the monitoring management program causes the computer to serve as: a storage means that stores connection information indicating a connection state of the wireless device connected to the communication system; a display means that displays the wireless device connected to the communication system based on the connection information stored in the storage means; an input means that receives an instruction related to the wireless device displayed on the display means; and a control means that performs control of temporarily interrupting communication of a wireless device, other than a wireless device satisfying conditions set in advance, with reference to the connection information stored in the storage means when a simultaneous interruption instruction to simultaneously interrupt communication of a wireless device is input to the input means.

The control means may perform control of temporarily interrupting communication of a wireless device, other than a specified wireless device based on an instruction input to the input means before the simultaneous interruption instruction is input, among the wireless devices connected to the communication system.

When a communication path of the specified wireless device based on the instruction input to the input means has been established via another wireless device, the control means may perform control of temporarily interrupting communication of a wireless device other than the specified wireless device and the other wireless device.

A priority may have been set for each of the plurality of wireless devices, and the control means may perform control of temporarily interrupting communication of a wireless device with a priority lower than a priority set based on the instruction input to the input means.

The storage means may further store information related to a wireless device and data transmitted between the wireless device and a system manager.

The control means may search for a communication path of the wireless device with reference to the connection information, which has been stored in the storage means and indicates the connection state of the wireless device connected to the communication system, and the information related to the wireless device.

According to the present invention, if a simultaneous interruption instruction for simultaneously interrupting communication by wireless devices connected to a communication system is input, control for temporarily interrupting communication by wireless devices, other than a wireless device satisfying conditions set in advance, is performed with reference to connection information stored in a storage unit.

Consequently, it is possible to quickly interrupt communication by wireless devices, other than a specific wireless device, through very easy manipulation.

BRIEF DESCRIPTION OF THE DRAWINGS

The above features and advantages of the present invention will be more apparent from the following description of certain preferred embodiments taken in conjunction with the accompanying drawings, in which:

FIG. 4A is a diagram illustrating parameters related to sessions displayed on the monitoring management apparatus in the first preferred embodiment of the present invention;

FIG. 4B is a diagram illustrating parameters related to wireless devices displayed on the monitoring management apparatus in the first preferred embodiment of the present invention;

DETAILED DESCRIPTION OF THE PREFERRED EMBODIMENTS

Figure 1:
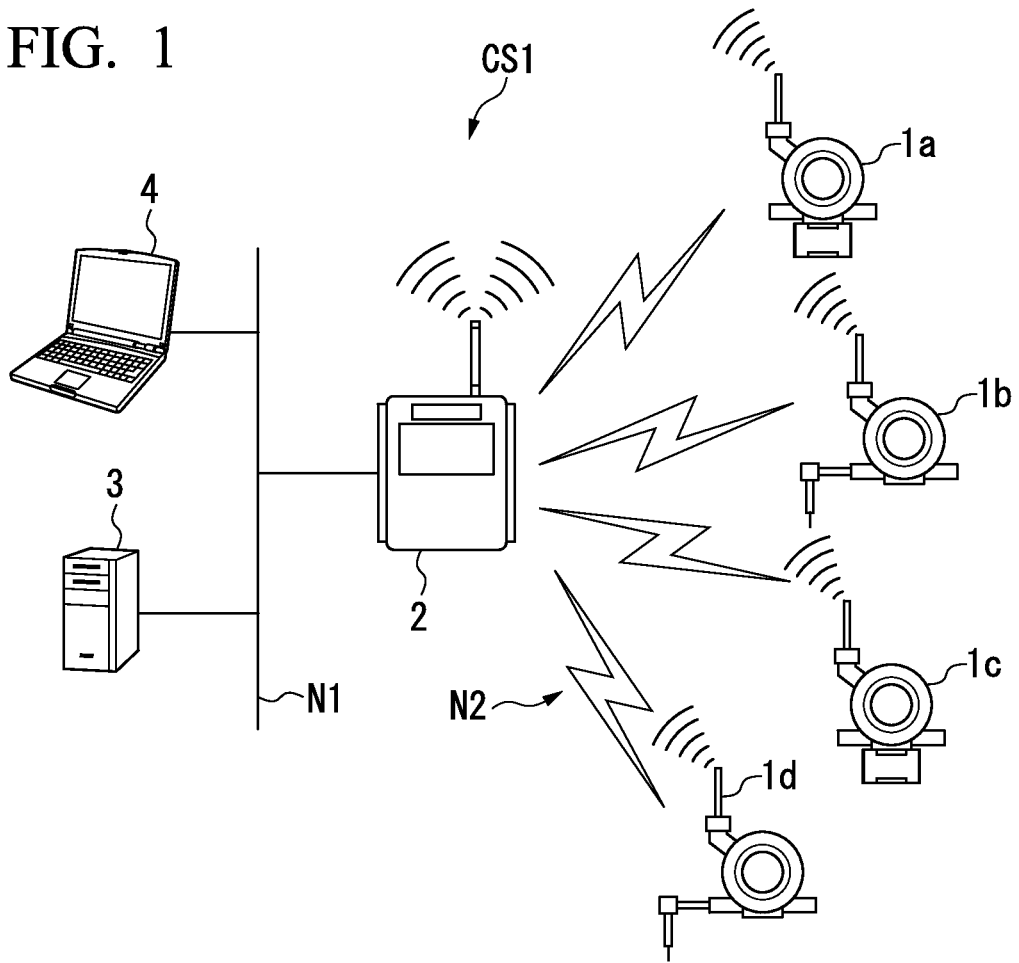
FIG. 1 is a block diagram illustrating an entire configuration of a communication system monitored and managed by a monitoring management apparatus in accordance with a first preferred embodiment of the present invention.

The present invention will be now described herein with reference to illustrative preferred embodiments. Those skilled in the art will recognize that many alternative preferred embodiments can be accomplished using the teaching of the present invention and that the present invention is not limited to the preferred embodiments illustrated herein for explanatory purposes.
First Preferred Embodiment FIG. 1 is a block diagram illustrating an entire configuration of a communication system monitored and managed by a monitoring management apparatus in accordance with a first preferred embodiment of the present invention. As illustrated in FIG. 1, a communication system CS1 includes wireless devices 1a to 1d, a gateway 2, a system manager 3, and a monitoring management apparatus 4. Under the monitoring and management of the monitoring management apparatus 4, communication of various types of information is possible via the gateway 2 between the wireless devices 1a to 1d and the system manager 3. FIG. 1 illustrates four wireless devices 1a to 1d. However, the number of the wireless devices is arbitrary.

The wireless devices 1a to 1d, for example, include a sensor device such as a flowmeter or a temperature sensor, a valve device such as a flow control valve or an on-off valve, and a wireless field device such as an actuator device including a fan, a motor and the like, which are installed in a plant or a factory. The wireless devices 1a to 1d perform wireless communication conforming to the ISA 100.11a which is an industrial automation wireless communication standard. The operations of the wireless devices 1a to 1d are controlled based on control data received from the system manager 3 via the gateway 2. Measurement data acquired by the wireless devices 1a to 1d is collected by the system manager 3 via the gateway 2.

The gateway 2 connects a wired network N1, to which the system manager 3 and the monitoring management apparatus 4 are connected, to a wireless network N2 to which the wireless devices 1a to 1d are connected, and relays various pieces of data to be transmitted/received between the wireless devices 1a to 1d and the system manager 3. The gateway 2 also performs wireless communication conforming to the wireless communication standard ISA 100.11a.

The system manager 3 is connected to the wired network N1. The system manager 3 performs control and the like of the wireless devices 1a to 1d connected to the wireless network N2 while communicating with the wireless devices 1a to 1d via the wireless network N2 formed by the gateway 2. In detail, the system manager 3 performs control (for example, control of the opening and closing of a valve) of the wireless devices 1a to 1d having entered the wireless network N2, and collection of measurement data measured by the wireless devices 1a to 1d having entered the wireless network N2. In addition, the system manager 3 also performs an entry process regarding whether to allow a new wireless device to enter the wireless network.

The monitoring management apparatus 4 is connected to the wired network N1, and exchanges various types of information with the system manager 3 to perform monitoring and management of the communication system CS1. In detail, the monitoring management apparatus 4 acquires various types of information (connection information indicating connection states of the wireless devices 1a to 1d) for monitoring the communication system CS1 from the system manager 3, and displays the acquired information. Furthermore, the monitoring management apparatus 4 gives various instructions for managing the communication system CS1 to the system manager 3.

Furthermore, the monitoring management apparatus 4 performs control for temporarily interrupting communication of the wireless devices 1a to 1d having entered the wireless network N2, without the system manager 3. The reason for performing such control is to give a priority to communication of a specific wireless device of the wireless devices 1a to 1d having entered the wireless network N2 at the time of a test or emergency, rather than communication of other wireless devices.

Figure 2:
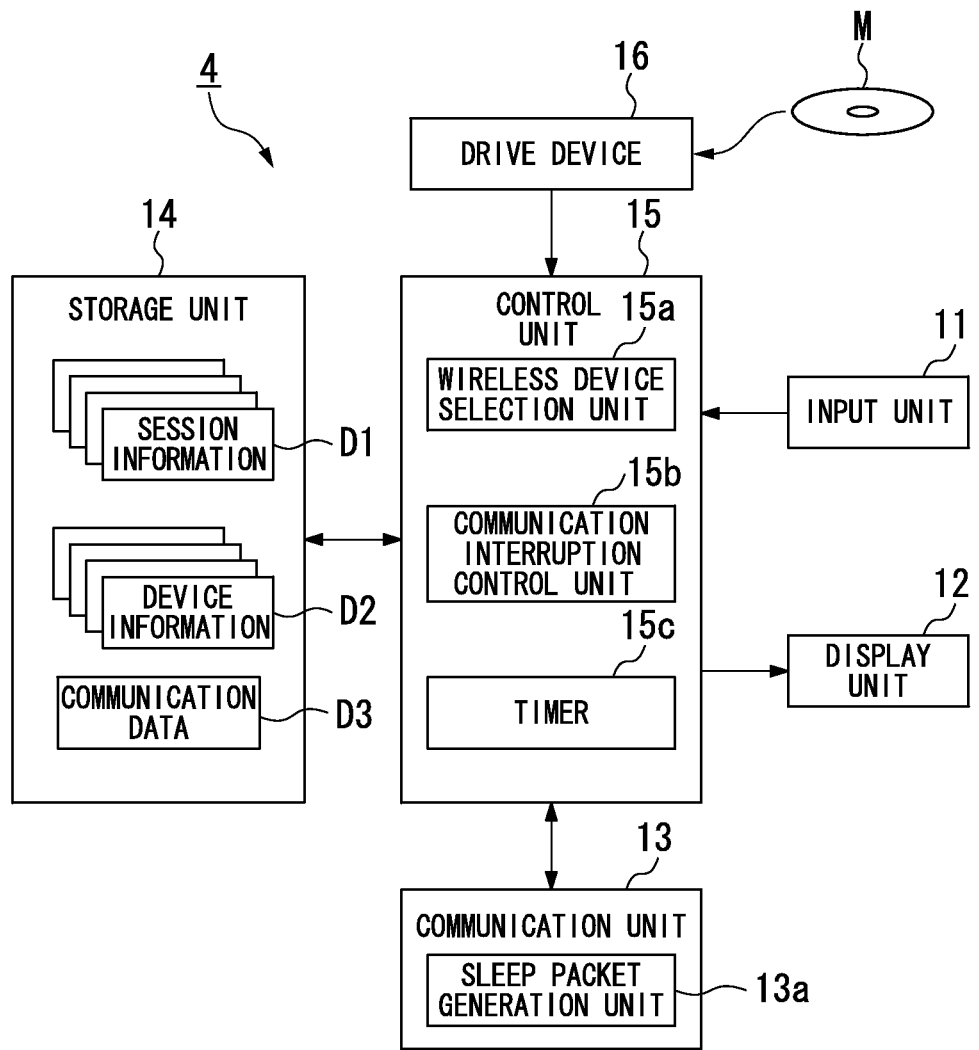
FIG. 2 is a block diagram illustrating a configuration of main elements of the monitoring management apparatus in accordance with the first preferred embodiment of the present invention.

FIG. 2 is a block diagram illustrating a configuration of main elements of the monitoring management apparatus in accordance with the first preferred embodiment of the present invention. As illustrated in FIG. 2, the monitoring management apparatus 4 in accordance with the first preferred embodiment includes an input unit 11, a display unit 12, a communication unit 13, a storage unit 14, a control unit 15, and a drive device 16. The input unit 11 is provided with an input device such as a keyboard or a mouse, and receives an instruction of a manager of the communication system CS1 which manipulates the monitoring management apparatus 4. The display unit 12 is provided with a display device such as a liquid crystal display device, and displays various types of information, such as device information related to the wireless devices 1a to 1d or connection information (session information) indicating the connection states of the wireless devices 1a to 1d, under the control of the control unit 15.

The communication unit 13 performs a generation process of a packet to be transmitted to the wired network N1, a transmission process of the generated packet, and a reception process of a packet transmitted via the wired network N1 under the control of the control unit 15. The communication unit 13 is provided with a sleep packet generation unit 13a that generates a sleep packet which is used to temporarily interrupt the communication of the wireless devices 1a to 1d for a predetermined time (for example, 60 seconds).

The storage unit 14 stores information or data necessary for performing the monitoring and management of the communication system CS1. In detail, as illustrated in FIG. 2, the storage unit 14 stores session information D1, device information D2, communication data D3 and the like. The session information D1 is connection information indicating the connection states of the wireless devices 1a to 1d. The device information D2 is information related to the wireless devices 1a to 1d, such as a device name or a manufacturer. Furthermore, the communication data D3, for example, is data transmitted/received between the wireless devices 1a to 1d and the system manager 3, such as measurement data collected by the system manager 3 from the wireless devices 1a to 1d.

The control unit 15 integrally controls the operation of the monitoring management apparatus 4 by controlling each block illustrated in FIG. 2, thereby performing the monitoring and management of the communication system CS1. In detail, the control unit 15 communicates with the communication unit 13 by controlling the communication unit 13, thereby acquiring various types of information (for example, connection information indicating the connection states of the wireless devices 1a to 1d) for monitoring the communication system CS1. Furthermore, the control unit 15 also performs control for storing the acquired various types of information in the storage unit 14 and displaying the content of the acquired information on the display unit 12.

The control unit 15 is provided with a wireless device selection unit 15a, a communication interruption control unit 15b, and a timer 15c. The control unit 15 performs control for simultaneously and temporarily interrupting communication of wireless devices, other than a specific wireless device of the wireless devices 1a to 1d having entered the wireless network N2, with reference to the session information D1 and the device information D2 stored in the storage unit 14. For example, when the wireless device 1a is specified by an instruction which is input from the input unit 11 and a simultaneous interruption instruction, which indicates simultaneous interruption of the communication of wireless devices, is input from the input unit 11, the control unit 15 performs control for simultaneously and temporarily interrupting the communication of the wireless devices 1b to 1d other than the wireless device 1a.

The wireless device selection unit 15a selects a wireless device whose communication is to be interrupted, with reference to the session information D1 and the device information D2, which are stored in the storage unit 14, based on the instruction input from the input unit 11. In the above example, since the wireless device 1a is specified by the instruction input from the input unit 11 as a wireless device whose communication is to be continued without being interrupted, the wireless device selection unit 15a selects the wireless devices 1b to 1d, other than the wireless device 1a, as wireless devices whose communication is to be interrupted.

The communication interruption control unit 15b performs control for temporarily interrupting communication of the wireless device selected by the wireless device selection unit 15a. In detail, the communication interruption control unit 15b performs control for controlling the sleep packet generation unit 13a of the communication unit 13 to transmit the sleep packet to the wireless device selected by the wireless device selection unit 15a. Furthermore, the communication interruption control unit 15b also performs control for preventing the simultaneous interruption instruction from being given from the input unit 11 using the timer 15c for the time until communication is resumed after being interrupted.

The timer 15c counts a time under the control of the communication interruption control unit 15b. In detail, the timer 15c counts a time after the communication interruption control unit 15b performs the control of the transmission of the sleep packet to the wireless device. The time to be counted by the timer 15c is set to be equal to or longer than a time (for example, 60 seconds) for which the communication of the wireless devices 1a to 1d is to be interrupted by the sleep packet. This is to prevent the simultaneous interruption instruction from being given for the time for which the communication of the wireless devices is to be interrupted.

The drive device 16, for example, is a device that reads data recorded on a computer-readable recording medium M such as a CD-ROM or a DVD-ROM.

For example, if various pieces of data necessary for performing the monitoring and management of the communication system CS1 are recorded on the recording medium M, it is possible for the monitoring management apparatus 4 to read desired data using the drive device 16 when needed.

The functions of the input unit 11, the display unit 12, the communication unit 13, the storage unit 14, and the control unit 15 may also be realized by hardware. However, the functions may also be realized by software. That is, the functions of the input unit 11, the display unit 12, the communication unit 13, the storage unit 14, and the control unit 15 may also be realized by causing a computer to execute a program for realizing the functions. For example, the program for realizing the functions of the input unit 11, the display unit 12, the communication unit 13, the storage unit 14, and the control unit 15 is recorded on the recording medium M, and then is installed on a computer by the drive device 16, so that it is possible to perform the functions of the input unit 11, the display unit 12, the communication unit 13, the storage unit 14, and the control unit 15 through software.

It may also be possible to connect a computer to a network such as the Internet, and to allow a program the same as the program recorded on the recording medium M to be downloaded to the computer from the network. The program downloaded to the computer may be installed on the computer in the same manner as the case where the program is read from the computer-readable recording medium M through the drive device 16.

Figure 3:
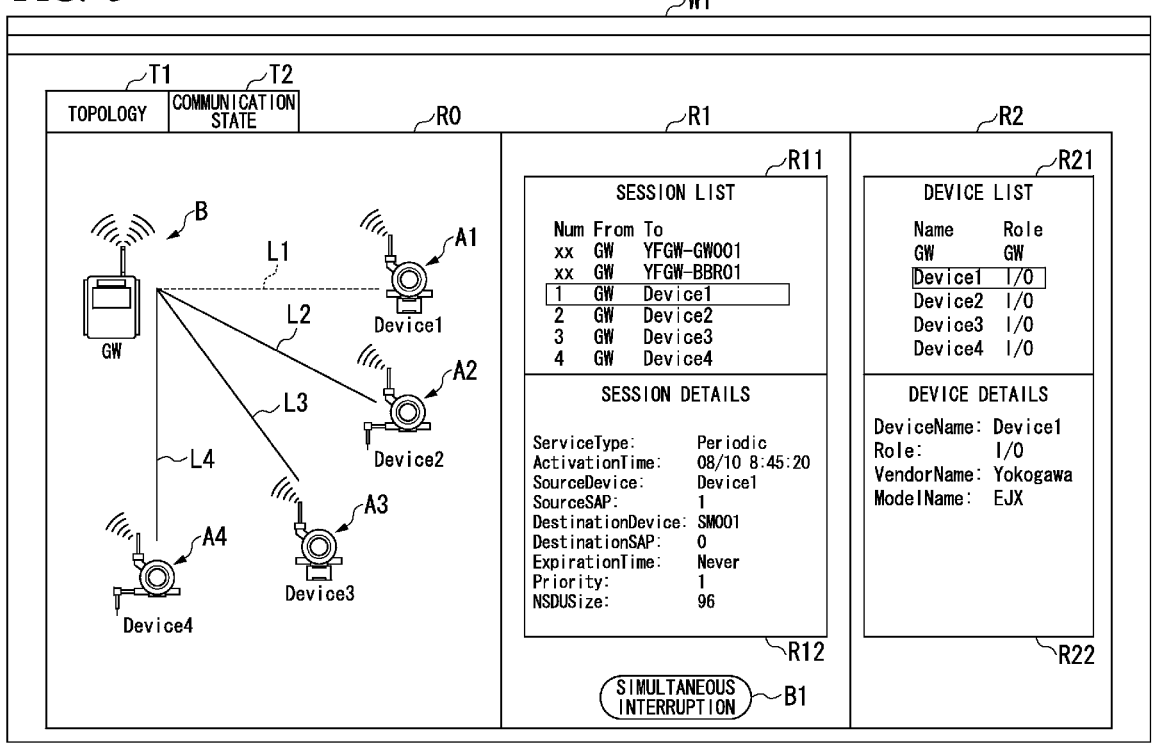
FIG. 3 is a diagram illustrating an example of display content displayed on the monitoring management apparatus in accordance with the first preferred embodiment of the present invention.

FIG. 3 is a diagram illustrating an example of display content displayed on the monitoring management apparatus in accordance with the first preferred embodiment of the present invention. As illustrated in FIG. 3, a window W1 is displayed on a display device provided in the display unit 12 of the monitoring management apparatus 4. The window W1 is provided with tabs T1 and T2 for switching display content. The tab T1 is a "topology" tab for displaying information indicating connection states between the wireless devices 1a to 1d and the gateway 2 on the window W1, and the tab T2 is a "communication state" tab for displaying communication states between the wireless devices 1a to 1d and the gateway 2 on the window W1.

When the "topology" tab T1 is selected, a topology display area R0, a session information display area R1, and a device information display area R2 are displayed on the window W1 as illustrated in FIG. 3. The topology display area R0 is used for graphically displaying a connection relation (that is, communication paths) between the wireless devices 1a to 1d which have entered the wireless network N2 and the gateway 2. The session information display area R1 is used to display the content of a communication session corresponding to connection information indicating the connection states of the wireless devices 1a to 1d. The device information display area R2 is used to display information related to the wireless devices 1a to 1d having entered the wireless network N2.

In the topology display area R0, the wireless devices 1a to 1d having entered the wireless network N2 and the gateway 2 are displayed in the form of icons, and straight lines indicating communication paths established between the wireless devices 1a to 1d and the gateway 2 are displayed in the form of a solid or broken line such that the icons are linked to one another. The example illustrated in FIG. 3 displays four icons A1 to A4 indicating the wireless devices 1a to 1d, an icon B indicating the gateway 2, and straight lines L1 to L4 indicating the communication paths between the wireless devices 1a to 1d and the gateway 2. One or a plurality of icons and the straight lines, which have been displayed in the topology display area R0, may be selected through the manipulation of the input device of the input unit 11 by the manager.

The session information display area R1 is provided with a session list display area R11 and a session details display area R12. The session list display area R11 is used to display a session list which is a list of sessions established between the wireless devices 1a to 1d and the gateway 2, and the session details display area R12 is used to display detailed content of one session in the session list as parameters. One or a plurality of sessions in the session list, which have been displayed in the session list display area R11, may be selected through the manipulation of the input device of the input unit 11 by the manager.

Furthermore, the device information display area R2 is provided with a device list display area R21 and a device details display area R22. The device list display area R21 is used to display a device list which is a list of the wireless devices 1a to 1d having entered the wireless network N2. The device details display area R22 is used to display detailed content of one wireless device in the device list as parameters. One or a plurality of wireless devices in the device list, which have been displayed in the device list display area R21, may be selected through the manipulation of the input device of the input unit 11 by the manager.

FIG. 4A is a diagram illustrating parameters related to sessions displayed on the monitoring management apparatus in the first preferred embodiment of the present invention, and FIG. 4B is a diagram illustrating parameters related to wireless devices displayed on the monitoring management apparatus in the first preferred embodiment of the present invention. As illustrated in FIG. 4A, the parameters related to sessions include "ServiceType," "ActivationTime," "SourceDevice," "SourceSAP," "DestinationDevice," "DestinationSAP," "ExpirationTime," "Priority," and "NSDUSize."

The "ServiceType" is a parameter indicating whether the type of communication is periodic communication or non-periodic communication. The "ActivationTime" is a parameter indicating an activation time of a session. The "SourceDevice" is a parameter indicating a device name of a transmission source of a session. The "SourceSAP" is a parameter indicating a process name of a transmission source of a session. The "DestinationDevice" is a parameter indicating a device name of a transmission destination of a session. The "DestinationSAP" is a parameter indicating a process name of a transmission destination of a session. The "ExpirationTime" is a parameter indicating an expiration time of a session. The "Priority" is a parameter indicating the priority of a session. The "NSDUSize" is a parameter indicating the size of a network-layer service data unit (NSDU).

As illustrated in FIG. 4B, the parameters related to wireless devices include "DeviceName," "Role," "VendorName," and "ModelName." The "DeviceName" is a parameter indicating a device name of a wireless device. The "Role" is a parameter indicating a role set in a wireless device. The "VendorName" is a parameter indicating a vendor of a wireless device. The "ModelName" is a parameter indicating a model name of a wireless device.

In the example illustrated in FIG. 3, a simultaneous interruption button B1 is provided in the session information display area R1. The simultaneous interruption button B1 is used to temporarily interrupt communication of wireless devices other than a wireless device satisfying conditions set in advance. In detail, the simultaneous interruption button B1 is used to simultaneously and temporarily interrupt communication of wireless devices, other than a wireless device that has been selected (specified) in an area of the topology display area R0, the session information display area R1, and the device information display area R2, or communication to be performed via communication paths, other than a communication path that has been selected (specified) in these areas. The simultaneous interruption button B1 may be pressed through the manipulation of the input device of the input unit 11 by the manager.

Figure 5:
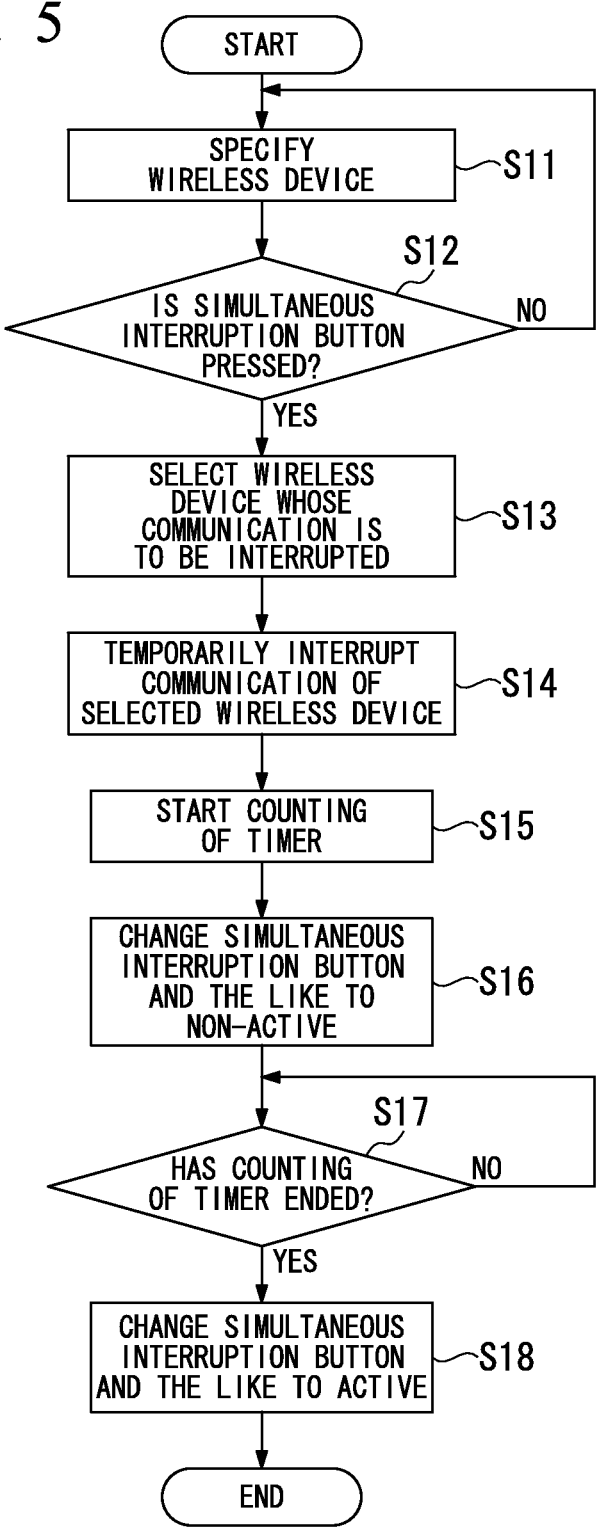
FIG. 5 is a flowchart illustrating the operation of the monitoring management apparatus in accordance with the first preferred embodiment of the present invention.

Next, an operation of the monitoring management apparatus having the above configuration will be described. FIG. 5 is a flowchart illustrating the operation of the monitoring management apparatus in accordance with the first preferred embodiment of the present invention. Hereinafter, it is assumed that the four wireless devices 1a to 1d have entered the wireless network of the communication system CS1, and the session information D1 and the device information D2 related to the wireless devices 1a to 1d are stored in the storage unit 14 of the monitoring management apparatus 4. Furthermore, hereinafter, an operation when communication of the wireless devices 1b to 1d, other than the wireless device 1a, among the wireless devices 1a to 1d is temporarily interrupted will be described as an example.

First, the connection states of the wireless devices 1a to 1d are confirmed by the manager of the communication system CS1 with reference to the content of the window W1 (refer to FIG. 3) displayed on the display device provided in the display unit 12 of the monitoring management apparatus 4. When the window W1 illustrated in FIG. 3 is not displayed on the display device, the manager manipulates the input device of the input unit 11 provided in the monitoring management apparatus 4, thereby displaying the window W1.

When the connection states of the wireless devices 1a to 1d are confirmed, the input device provided in the input unit 11 of the monitoring management apparatus 4 is manipulated by the manager of the communication system CS1 and a process in which the wireless device 1a whose communication is to be continued is specified from among the wireless devices 1a to 1d is performed in step S11. In detail, manipulation for specifying any one of the icon A1 and the straight line L1 displayed in the topology display area R0, a session for the wireless device 1a in the session list displayed in the session list display area R11, and the wireless device 1a in the device list displayed in the device list display area R21 is performed by the manager of the communication system CS1, and information indicating the specified wireless device 1a is input to the control unit 15, wherein the topology display area R0, the session list display area R11, and the device list display area R21 are displayed on the window W1 illustrated in FIG. 3.

In step S12, the control unit 15 determines whether the simultaneous interruption button B1 provided in the session information display area R1 of the window W1 illustrated in FIG. 3 has been pressed by the manager of the communication system CS1. When the simultaneous interruption button B1 has not been pressed, that is, when a determination result is "NO," the procedure returns to step S11 so as to perform a process for specifying the wireless device 1a whose communication is to be continued.

On the other hand, when the simultaneous interruption button B1 has been pressed, that is, when the determination result of step S12 is "YES," the wireless device selection unit 15a performs a process for selecting wireless devices whose communication is to be interrupted in step S13. In detail, the wireless device selection unit 15a performs a process for selecting the wireless devices 1b to 1d, other than the wireless device 1a specified in step S11 before the simultaneous interruption button B1 is pressed, from all the wireless devices 1a to 1d having entered the wireless network with reference to the session information D1 and the device information D2 stored in the storage unit 14.

In step S14, the communication interruption control unit 15b performs a process for temporarily interrupting communication of the wireless devices 1b to 1d selected by the wireless device selection unit 15a. In detail, the communication interruption control unit 15b performs a process for controlling the sleep packet generation unit 13a of the communication unit 13 to transmit a sleep packet to the wireless devices 1b to 1d selected by the wireless device selection unit 15a.

If the sleep packet transmitted from the monitoring management apparatus 4 is received in the wireless devices 1b to 1d, the wireless devices 1b to 1d transmit responses indicating that the sleep packet has been received to the monitoring management apparatus 4, and then enter a sleep state. In this way, the communication of the wireless devices 1b to 1d is interrupted for a predetermined time (for example, 60 seconds). However, when there is no response indicating the reception of the sleep packet from the wireless device to which the sleep packet has been transmitted, the communication interruption control unit 15b performs a process for retransmitting the sleep packet to the wireless device.

When the above processes end, the counting of the timer 15c is allowed to start in step S15, and the communication interruption control unit 15b performs a process for changing the simultaneous interruption button B1 provided in the window W1, the icons for the wireless devices 1b to 1d whose communication has been temporarily interrupted, and the like to a non-active state. In detail, the simultaneous interruption button B1 provided in the window W1, the icons A2 to A4 and the straight lines L2 to L4 displayed in the topology display area R0, the sessions for the wireless devices 1b to 1d in the session list displayed in the session list display area R11, and the wireless devices 1b to 1d in the device list displayed in the device list display area R21 enter a non-active state. In this way, manipulation of the simultaneous interruption button B1, the icons A2 to A4 and the like is not possible.

In step S17, the communication interruption control unit 15b determines whether the counting of the timer 15c has ended. When it is determined that the counting of the timer 15c has not ended, that is, when a determination result is "NO," the process of step S17 is continued. On the other hand, when it is determined that the counting of the timer 15c has ended, that is, when the determination result is "YES," the procedure proceeds to step S18 so that the communication interruption control unit 15b performs a process for changing the simultaneous interruption button B1, the icons A2 to A4 and the like, which have entered the non-active state in step S16, to an active state.

A time to be counted by the timer 15c is set to be equal to or longer than a time (for example, 60 seconds) for which the communication of the wireless devices 1b to 1d is interrupted. Therefore, if malfunction does not occur in the wireless devices 1b to 1d, the communication of the wireless devices 1b to 1d is resumed at the time at which the counting of the timer 15c ends. Consequently, the counting of the timer 15c ends and then the simultaneous interruption button B1 and the icons A2 to A4, which have entered the active state, are manipulated, so that it is possible to interrupt communication of the wireless device, other than the wireless devices corresponding to the manipulation content, in the same manner.

As described above, in the first preferred embodiment of the present invention, when the wireless device 1a whose communication is to be continued, has been specified and the simultaneous interruption button B1 has been pressed, the wireless devices 1b to 1d, other than the wireless device 1a, are selected with reference to the session information D1 and the device information D2 stored in the storage unit 14, and the communication of the selected wireless devices 1b to 1d is simultaneously interrupted. Consequently, it is possible to quickly interrupt the communication of the wireless devices 1b to 1d, other than the specified wireless device 1a selected by the manager of the communication system CS1, through very easy manipulation.

Second Preferred Embodiment

Next, a second preferred embodiment of the present invention will be described. In the first preferred embodiment of the present invention, it is assumed that the connection types of the wireless devices 1a to 1d having entered the wireless communication network correspond to single-hop connections indicating direct connections to the gateway 2. In the second preferred embodiment of the present invention, it is assumed that the communication of wireless devices, other than a specific wireless device, is interrupted even when the connection types of the wireless devices having entered the wireless communication network correspond to multi-hop connections indicating connections to the gateway 2 via another wireless device.

Figure 6:
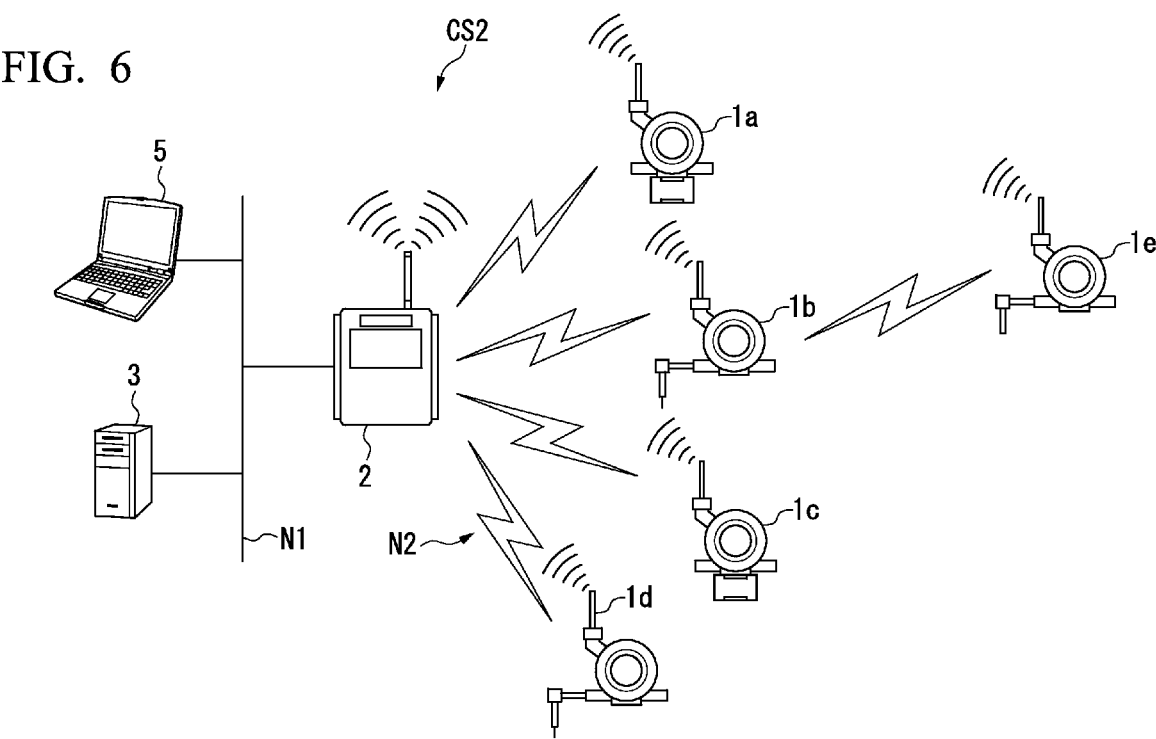
FIG. 6 is a block diagram illustrating an entire configuration of a communication system monitored and managed by a monitoring management apparatus in accordance with the second preferred embodiment of the present invention.

FIG. 6 is a block diagram illustrating an entire configuration of a communication system monitored and managed by a monitoring management apparatus in accordance with the second preferred embodiment of the present invention. As illustrated in FIG. 6, a communication system CS2 includes wireless devices 1a to 1e, a gateway 2, a system manager 3, and a monitoring management apparatus 5. Under the monitoring and management of the monitoring management apparatus 5, communication of various types of information is possible between the wireless devices 1a to 1e and the system manager 3 via the gateway 2. The wireless devices 1a to 1d, the gateway 2, and the system manager 3 in FIG. 6 are the same as those illustrated in FIG. 1.

As illustrated in FIG. 6, among the wireless devices 1a to 1e, the wireless devices 1a to 1d are directly connected to the gateway 2 similarly to the first preferred embodiment. On the other hand, among the wireless devices 1a to 1e, the wireless device 1e is connected to the gateway 2 via the wireless device 1b. That is, a communication path between the wireless device 1e and the gateway 2 is established via the wireless device 1b. However, a plurality of wireless devices may also be connected to the gateway 2 via a wireless device.

Figure 7:
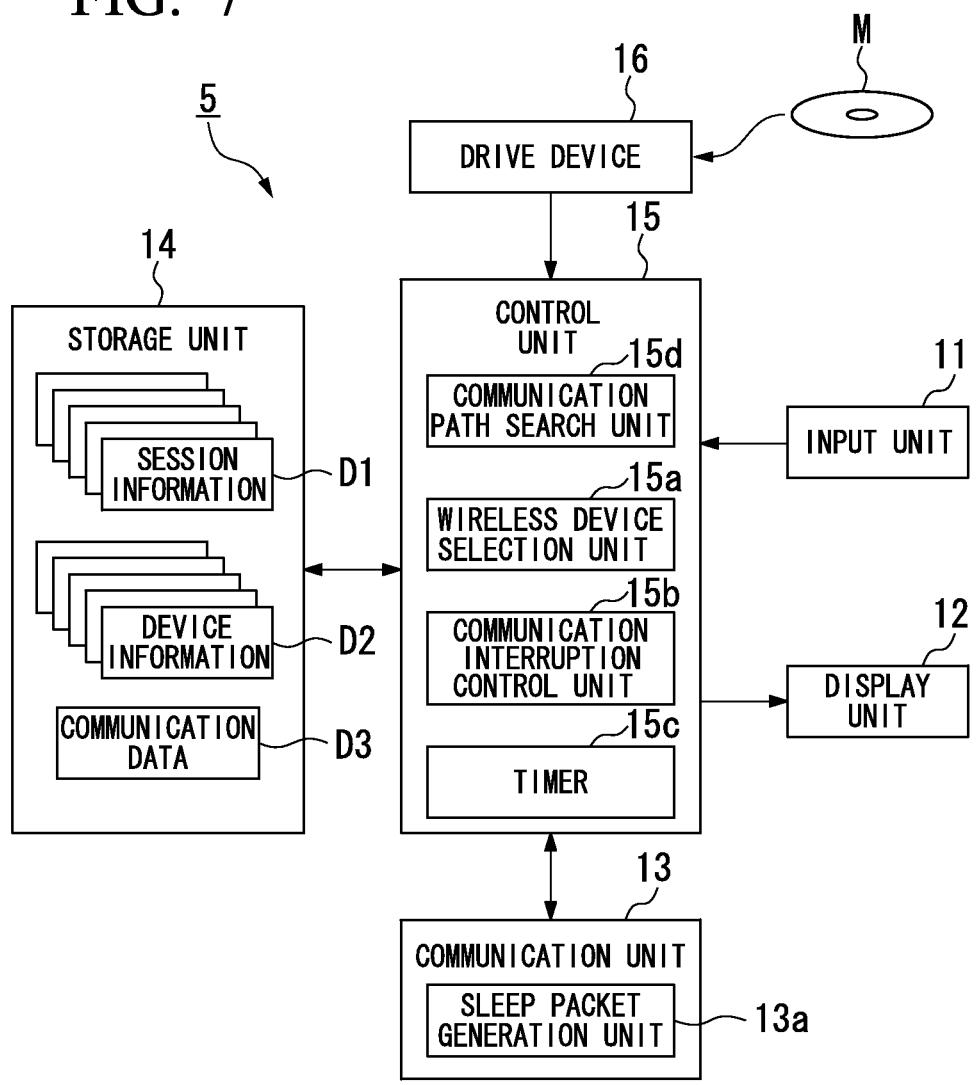
FIG. 7 is a block diagram illustrating a configuration of main elements of the monitoring management apparatus in accordance with the second preferred embodiment of the present invention.

FIG. 7 is a block diagram illustrating a configuration of main elements of the monitoring management apparatus in accordance with the second preferred embodiment of the present invention. As illustrated in FIG. 7, the monitoring management apparatus 5 in accordance with the second preferred embodiment includes an input unit 11 (an input unit), a display unit 12 (a display unit), a communication unit 13, a storage unit 14 (a storage unit), a control unit 15 (a control unit), and a drive device 16. The monitoring management apparatus 5 in accordance with the second preferred embodiment of the present invention has substantially the same configuration as the monitoring management apparatus 4 illustrated in FIG. 2, except that a communication path search unit 15d is further provided in the control unit 15.

The communication path search unit 15d searches for communication paths of wireless devices with reference to the session information D1 and the device information D2 stored in the storage unit 14. In detail, communication paths to the gateway 2 from the multi-hop connected wireless device 1e are searched in reverse order using the parameters "SourceDevice" (or "SourceSAP") and "DestinationDevice" (or "DestinationSAP") related to the sessions illustrated in FIG. 4A.

Even in the second preferred embodiment of the present invention, the functions of the above-mentioned input unit 11, display unit 12, communication unit 13, storage unit 14, and control unit 15 may also be realized by hardware. However, the functions may also be realized by software. That is, a program for realizing the functions of the input unit 11, the display unit 12, the communication unit 13, the storage unit 14, and the control unit 15, which has been recorded on the recording medium M, is read using the drive device 16 and is installed on a computer, or a program the same as the program recorded on the recording medium M is downloaded via a network such as the Internet and is installed on the computer, so that it is possible to perform the functions of the input unit 11, the display unit 12, the communication unit 13, the storage unit 14, and the control unit 15 through software.

Figure 8:
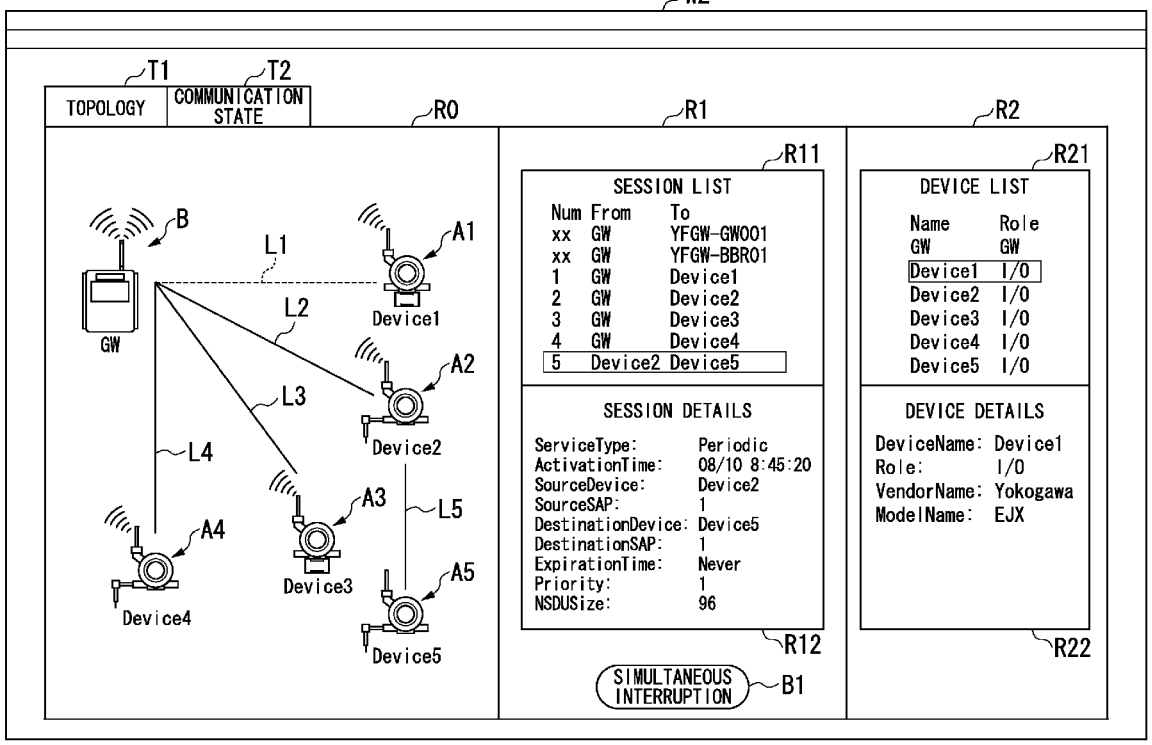
FIG. 8 is a diagram illustrating an example of display content displayed on the monitoring management apparatus in accordance with the second preferred embodiment of the present invention.

FIG. 8 is a diagram illustrating an example of display content displayed on the monitoring management apparatus in accordance with the second preferred embodiment of the present invention. As illustrated in FIG. 8, a window W2 is displayed on the display device provided in the display unit 12 of the monitoring management apparatus 5. Similarly to the window W1 illustrated in FIG. 3, the window W2 is provided with a "topology" tab T1 and a "communication state" tab T2. When the "topology" tab T1 is selected, a topology display area R0, a session information display area R1, and a device information display area R2 are displayed on the window W2.

Similarly to the first preferred embodiment, among the wireless devices 1a to 1e illustrated in FIG. 6, the wireless devices 1a to 1d are directly connected to the gateway 2. Therefore, in the topology display area R0 on the window W2, four icons A1 to A4 indicating the wireless devices 1a to 1d, an icon B indicating the gateway 2, and straight lines L1 to L4 indicating communication paths between the wireless devices 1a to 1d and the gateway 2 are displayed. Furthermore, the remaining wireless device 1e illustrated in FIG. 6 is connected to the gateway 2 via the communication device 1b. Therefore, in the topology display area R0 on the window W2, an icon A5 indicating the wireless device 1e, and a straight line L5 indicating a communication path between the wireless device 1e and the wireless device 1b are displayed.

Furthermore, similarly to the window W1 illustrated in FIG. 3, the session information display area R1 on the window W2 is provided with a session list display area R11, a session details display area R12, and a simultaneous interruption button B1. Furthermore, the device list display area R21 and the device details display area R22 are provided in the device information display area R2 on the window W2.

Next, an operation of the monitoring management apparatus having the above configuration will be described. The basic operation of the monitoring management apparatus 5 in the second preferred embodiment of the present invention is the same as that of the monitoring management apparatus 4 in the first preferred embodiment. That is, wireless device whose communication is to be continued is specified from among the wireless devices 1a to 1e based on an instruction from a manager of the communication system CS2 to the monitoring management apparatus 5, wireless devices, other than the specified wireless device, are selected, and a sleep packet is transmitted from the monitoring management apparatus 5 to the selected wireless device.

However, when the multi-hop connected wireless device 1e is specified by the instruction of the manager of the communication system CS2, the communication path search unit 15d of the control unit 15 searches for a communication path to the gateway 2 from the wireless device 1e. Next, the wireless device selection unit 15a selects the wireless devices 1a, 1c and 1d, other than the wireless devices 1b and 1e on the communication path, as wireless devices whose communication is to be interrupted. Then, under the control of the communication interruption control unit 15b, a sleep packet is transmitted to the wireless devices 1a, 1c and 1d.

As described above, in the second preferred embodiment of the present invention, when the wireless device 1e whose communication is to be continued has been specified and the simultaneous interruption button B1 has been pressed, communication paths to the gateway 2 from the wireless device 1e are searched with reference to the session information D1 and the device information D2 stored in the storage unit 14, the wireless devices 1a, 1c and 1d, other than the wireless devices 1b and 1e on the searched communication paths, are selected, and the communication of the selected wireless devices 1a, 1c and 1d is simultaneously interrupted. Consequently, it is possible to quickly interrupt the communication of the wireless devices 1a, 1c and 1d, other than the wireless devices 1b and 1e necessary for continuing the communication of the wireless device 1e specified by the manager of the communication system CS2, through very easy manipulation.

Third Preferred Embodiment

Next, a third preferred embodiment of the present invention will be described. In the above-mentioned first and second preferred embodiments, it is assumed that the communication of wireless devices, other than a wireless device specified by the manager, that is, a wireless device necessary for continuing communication, is simultaneously interrupted. On the other hand, in the third preferred embodiment of the present invention, a priority is set for each session or wireless device, and the communication of wireless devices is simultaneously interrupted based on the priority.

A monitoring management apparatus in accordance with the third preferred embodiment of the present invention can perform monitoring and management with respect to any one of the communication systems CS1 and CS2 illustrated in FIGS. 1 and 6. Hereinafter, it is assumed that the monitoring management apparatus performs the monitoring and management with respect to the communication system CS1 illustrated in FIG. 6. That is, an entire configuration of the communication systems to be monitored and managed by the monitoring management apparatus in accordance with the third preferred embodiment of the present invention corresponds to a configuration obtained by replacing the monitoring management apparatus 5 illustrated in FIG. 6 with a monitoring management apparatus in accordance with the third preferred embodiment of the present invention.

Figure 9:
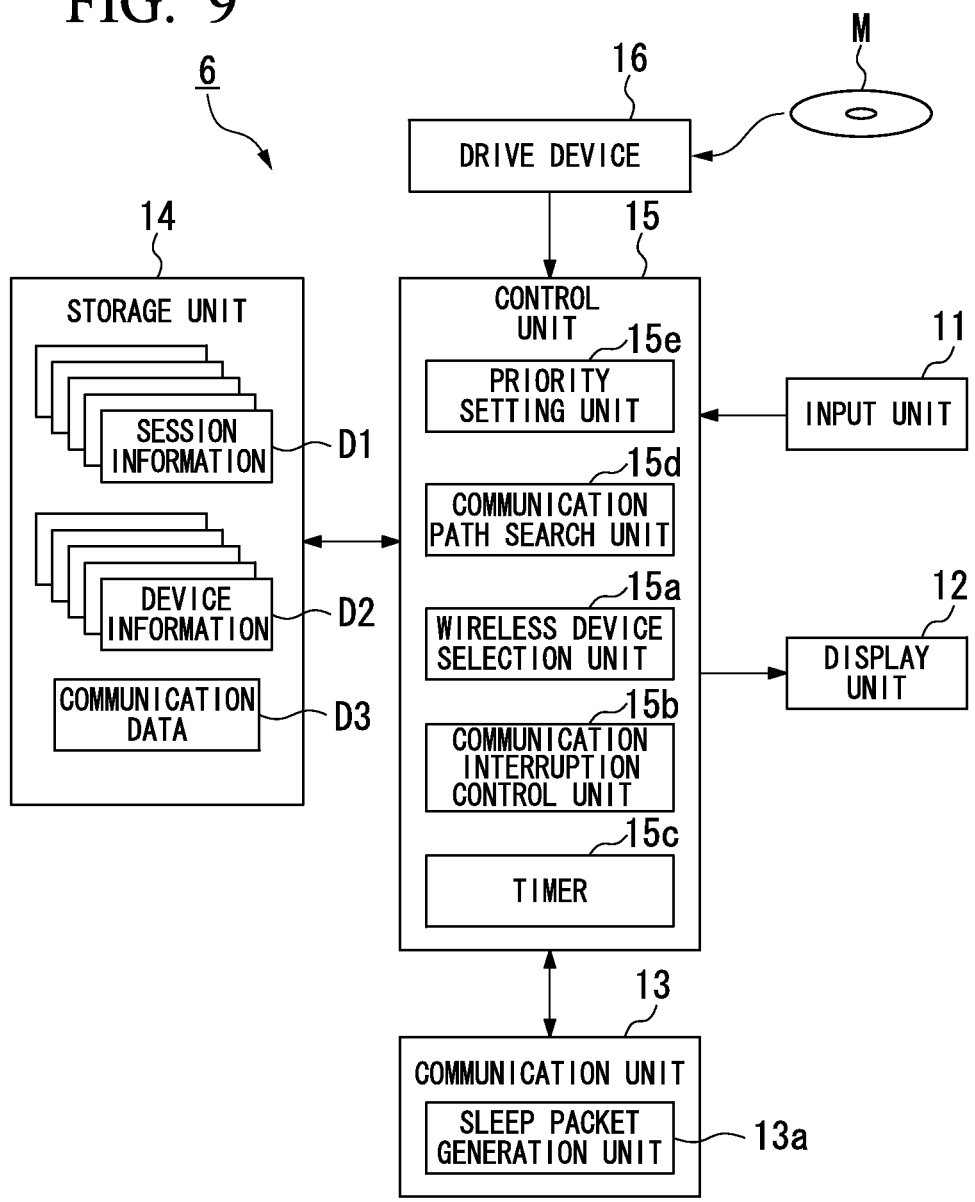
FIG. 9 is a block diagram illustrating a configuration of main elements of the monitoring management apparatus in accordance with the third preferred embodiment of the present invention.

FIG. 9 is a block diagram illustrating a configuration of main elements of the monitoring management apparatus in accordance with the third preferred embodiment of the present invention. As illustrated in FIG. 9, the monitoring management apparatus 6 in accordance with the third preferred embodiment of the third preferred embodiment includes an input unit 11, a display unit 12, a communication unit 13, a storage unit 14, a control unit 15, and a drive device 16. The monitoring management apparatus 6 in accordance with the third preferred embodiment of the present invention has substantially the same configuration as the monitoring management apparatus 5 illustrated in FIG. 7, except that a priority setting unit 15e is further provided in the control unit 15.

The priority setting unit 15e sets a priority for each session of the session information D1 stored in the storage unit 14. In detail, the priority setting unit 15e sets a priority of "0" to "5" for each session based on an instruction of a manager. Furthermore, the priority setting unit 15e sets a priority threshold value for defining a session in which communication is to be interrupted based on an instruction of the manager. A session with a priority lower than the priority defined by the priority threshold value is stopped.

Even in the third preferred embodiment, the functions of the above-mentioned input unit 11, display unit 12, communication unit 13, storage unit 14, and control unit 15 may also be realized by hardware. However, the functions may also be realized by software. That is, a program for realizing the functions of the input unit 11, the display unit 12, the communication unit 13, the storage unit 14, and the control unit 15, which has been recorded on the recording medium M, is read using the drive device 16 and is installed on a computer, or a program the same as the program recorded on the recording medium M is downloaded via a network such as the Internet and is installed on the computer, so that it is possible to perform the functions of the input unit 11, the display unit 12, the communication unit 13, the storage unit 14, and the control unit 15 through software.

Figure 10:
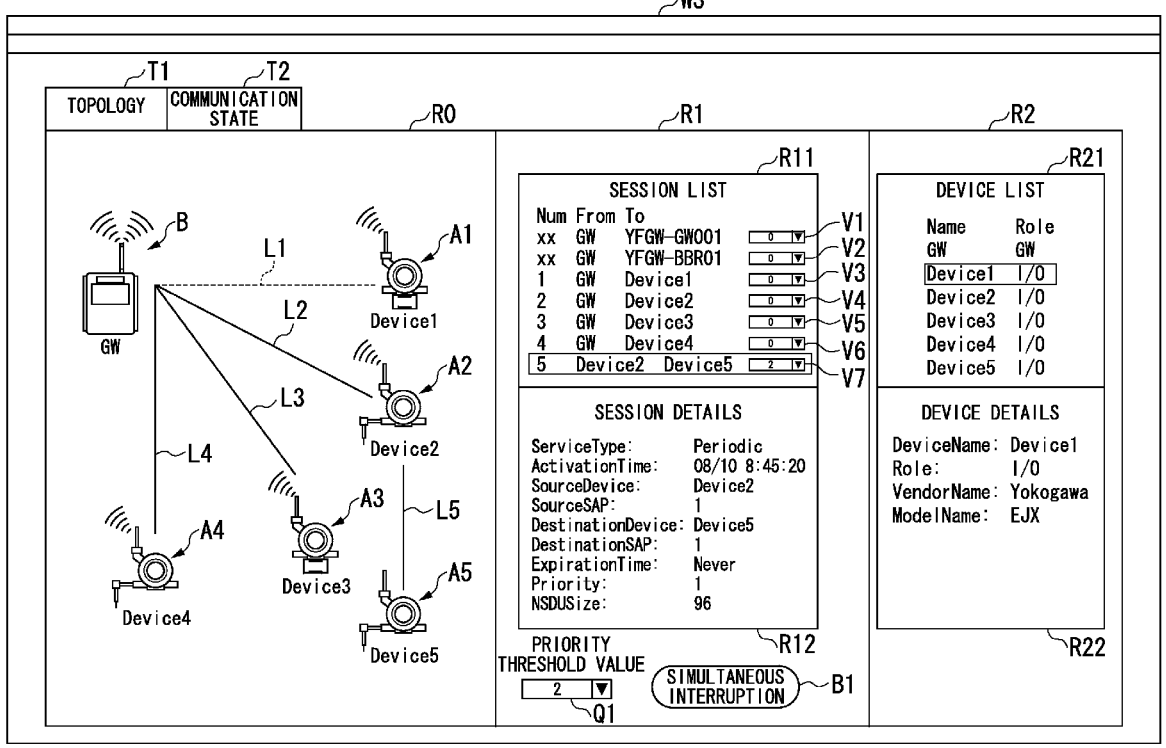
FIG. 10 is a diagram illustrating an example of display content displayed on the monitoring management apparatus in accordance with the third preferred embodiment of the present invention.

FIG. 10 is a diagram illustrating an example of display content displayed on the monitoring management apparatus in accordance with the third preferred embodiment of the present invention. As illustrated in FIG. 10, a window W3 is displayed on the display device provided in the display unit 12 of the monitoring management apparatus 6. Similarly to the window W2 illustrated in FIG. 8, the window W3 is provided with a "topology" tab T1 and a "communication state" tab T2. When the "topology" tab T1 is selected, a topology display area R0, a session information display area R1, and a device information display area R2 are displayed on the window W3.

However, a session list display area R11 in the session information display area R1 is provided with list boxes V1 to V7 for setting a priority for each session, and a list box Q1 for setting a priority threshold value is provided at a left side of a simultaneous interruption button B1 in the session information display area R1. A manager changes values of the list boxes V1 to V7 and Q1 used for manipulating the input device provided in the input unit 11, so that it is possible to change the priority, which is set for each session, and the priority threshold value in the range of "0" to "5."

Next, an operation of the monitoring management apparatus having the above configuration will be described. It is assumed that the priority for each session and the priority threshold value are set in advance by an instruction of the manager. In the example illustrated in FIG. 10, only a priority of a session between the wireless device 1b and the wireless device 1e has been set to "2," and priorities of remaining sessions have been set to "0." Furthermore, the priority threshold value has been set to "2."

In the state where the above setting has been made, for example, if an emergency alert (an alert) indicating the occurrence of an abnormal situation due to a natural disaster or the like is received in the monitoring management apparatus 6 via the wired network N1, the communication path search unit 15d of the control unit 15 searches for communication paths to the gateway 2 from the wireless device 1a to 1e. Next, the wireless device selection unit 15a selects a session with a priority, which is lower than the priority threshold value, as a session to be stopped.

On the communication path to the gateway 2 from the multi-hop connected wireless device 1e, there may be both a session with a priority equal to or higher than the priority threshold value and a session with a priority lower than the priority threshold value. In such a case, all sessions forming the communication path are excluded from the session to be stopped. In the example illustrated in FIG. 10, since the priority of the session between the wireless device 1b and the wireless device 1e has been set to "2" and the priority of a session between the wireless device 1b and the gateway 2 has been set to "0," these sessions are excluded from the session to be stopped.

Thus, sessions ultimately selected by the wireless device selection unit 15a include a session between the wireless device 1a and the gateway 2, a session between the wireless device 1c and the gateway 2, and a session between the wireless device 1d and the gateway 2. If sessions to be stopped are selected, a sleep packet is transmitted to the wireless devices 1a, 1c, and 1d in order to stop these sessions under the control of the communication interruption control unit 15b.

As described above, in the third preferred embodiment of the present invention, when the priority for each session and the priority threshold value for defining the session to be stopped have been set in advance and an emergency alert has been received, the session to be stopped is selected based on the priority and the priority threshold value, and the sleep packet is transmitted to the wireless devices 1a, 1c, and 1d in order to stop the selected session. Consequently, at the time of an emergency, for example, even when no instruction is given to the monitoring management apparatus 6 from a manager, it is possible to quickly interrupt the communication of wireless devices other than a wireless device prepared in advance.

In the third preferred embodiment, an example in which a priority has been set for each session has been described. However, a priority may also be set for each wireless device. Furthermore, when setting the priority for the wireless device, one priority is not set for each wireless device. For example, a priority may also be set for each parameter related to the wireless device as illustrated in FIG. 4B. Furthermore, in the third preferred embodiment, the example in which, when an emergency alert has been received, a manager interrupts the communication of wireless devices other than a wireless device prepared in advance has been described. However, the same process may also be performed even when the simultaneous interruption button B1 has been pressed by an instruction of the manager.

So far, the monitoring management apparatus, the monitoring management program, and the recording medium in accordance with the preferred embodiments of the present invention have been described. However, the present invention is not limited to the above-mentioned preferred embodiments. The present invention may be subject to addition, omission, replacement, and other modifications of the configuration in a range not departing from the spirit of the present invention. For example, in the above preferred embodiments, the example in which the gateway 2 is provided separately from the system manager has been described. However, the gateway 2 and the system manager 3 may also be provided as one device. Moreover, the functions of the monitoring management apparatuses 4, 5, and 6 may also be employed as the configuration provided in the system manager 3.

The term "configured" is used to describe a component, unit or part of a device includes hardware and/or software that is constructed and/or programmed to carry out the desired function.

Moreover, terms that are expressed as "means-plus function" in the claims should include any structure that can be utilized to carry out the function of that part of the present invention.

The term "unit" is used to describe a component, unit or part of a hardware and/or software that is constructed and/or programmed to carry out the desired function. Typical examples of the hardware may include, but are not limited to, a device and a circuit.

While preferred embodiments of the present invention have been described and illustrated above, it should be understood that these are examples of the present invention and are not to be considered as limiting. Additions, omissions, substitutions, and other modifications can be made without departing from the scope of the present invention. Accordingly, the present invention is not to be considered as being limited by the foregoing description, and is only limited by the scope of the claims.

What is claimed is:

1. A monitoring management apparatus that performs monitoring and management of a communication system to which a plurality of wireless devices are connected, the monitoring management apparatus comprising:
   a storage unit configured to store connection information indicating a connection state of each of the plurality of wireless devices connected to the communication system;
   a display unit configured to display the plurality of wireless devices connected to the communication system based on the connection information stored in the storage unit;
   an input unit configured to receive an instruction related to each of the plurality of wireless devices displayed on the display unit, the instruction specifying communication with which wireless device is to be continued from among the plurality of wireless devices, the input unit being configured to receive a simultaneous interruption instruction to simultaneously interrupt communication of wireless devices not specified; and
   a control unit configured to temporarily interrupt communication of the plurality of wireless devices, other than the specified wireless device, with reference to the connection information stored in the storage unit when the simultaneous interruption instruction is input to the input unit.

2. The monitoring management apparatus according to claim 1, wherein the control unit is configured to temporarily interrupt communication of a wireless device, other than the specified wireless device based on the instruction input to the input unit before the simultaneous interruption instruction is input, among the plurality of wireless devices connected to the communication system.

3. The monitoring management apparatus according to claim 2, wherein, when a communication path of the specified wireless device based on the instruction input to the input unit has been established via another wireless device, the control unit is configured to temporarily interrupt communication of a wireless device other than the specified wireless device and the other wireless device.

4. The monitoring management apparatus according to claim 1, wherein a priority has been set for each of the plurality of wireless devices, and the control unit is configured to temporarily interrupt communication of a wireless device with a priority lower than a priority set based on the instruction input to the input unit.

5. The monitoring management apparatus according to claim 1, wherein the storage unit is configured to further store information related to a wireless device and data transmitted between the wireless device and a system manager.

6. The monitoring management apparatus according to claim 5, wherein the control unit is configured to search for a communication path of the wireless device with reference to the connection information, which has been stored in the storage unit and to indicate the connection state of the wireless device connected to the communication system, and the information related to the wireless device.

7. The monitoring management apparatus according to claim 1, further comprising:
   a communication unit configured to perform a generation process of a packet to be transmitted via a wired network to the storage unit and the display unit, a transmission process of the generated packet, and a reception process of a packet transmitted via the wired network under a control of the control unit.

8. The monitoring management apparatus according to claim 7, wherein the communication unit comprises a sleep packet generation unit configured to generate a sleep packet which is used to temporarily interrupt the communication of the plurality of wireless devices for a predetermined time.

9. The monitoring management apparatus according to claim 8, wherein:
   the control unit comprises a timer configured to count a time after a control of the transmission of the sleep packet to the wireless device is performed by the control unit, and
   the control unit performs control for preventing the simultaneous interruption instruction from being given from the input unit using the timer for a time until the communication is resumed after being interrupted.

10. The monitoring management apparatus according to claim 1, further comprising:
    a wireless device selection unit configure to specify a wireless device whose communication is to be interrupted, with reference to the connection information and a device information of the wireless device, which are stored in the storage unit, based on the instruction input from the input unit.

11. A monitoring management method that performs monitoring and management of a communication system to which a plurality of wireless devices are connected, the monitoring management method comprising:
    storing connection information indicating a connection state of each of the plurality of wireless devices connected to the communication system;

displaying the plurality of wireless devices connected to the communication system based on the connection information that has been stored;

receiving an instruction related to each of the plurality of wireless devices that has been displayed, the instruction specifying communication with which wireless device is to be continued from among the plurality of wireless devices, and receiving a simultaneous interruption instruction to simultaneously interrupt communication of wireless devices not specified; and temporarily interrupting communication of the plurality of wireless devices, other than the specified wireless device, with reference to the connection information, which has been stored, when the simultaneous interruption instruction is input.

12. The monitoring management method according to claim 11, further comprising:

temporarily interrupting communication of a wireless device, other than the specified wireless device based on the instruction that has been input before the simultaneous interruption instruction is input, among the plurality of wireless devices connected to the communication system.

13. The monitoring management method according to claim 12, further comprising:

temporarily interrupting communication of a wireless device other than the specified wireless device and the other wireless device when a communication path of the specified wireless device based on the instruction, which has been input, has been established via another wireless device.

14. The monitoring management method according to claim 11, wherein a priority has been set for each of the plurality of wireless devices, and the monitoring management method further comprising:

temporarily interrupting communication of a wireless device with a priority lower than a priority set based on the instruction that has been input.

15. The monitoring management method according to claim 11, further comprising:

storing information related to a wireless device and data transmitted between the wireless device and a system manager.

16. The monitoring management method according to claim 15, further comprising:

searching for a communication path of the wireless device with reference to the connection information, which has been stored and indicating the connection state of the wireless device connected to the communication system, and the information related to the wireless device.

17. A non-transitory computer-readable device storing a monitoring management program, which, when loaded into an internal memory of a computer connected for monitoring and management of a communication system, will cause the computer to execute:

storing, in a storage means, connection information indicating a connection state of each of the plurality of wireless devices connected to the communication system;

displaying, on a display means, the plurality of wireless devices connected to the communication system based on the connection information stored in the storage means;

receiving, by an input means, an instruction related to each of the plurality of wireless devices displayed on the display means, the instruction specifying communication with which wireless device is to be continued from among the plurality of wireless devices, and receiving, by the input means, a simultaneous interruption instruction to simultaneously interrupt communication of wireless devices not specified; and temporarily interrupting communication of the plurality of wireless devices, other than the specified wireless device, with reference to the connection information stored in the storage means when the simultaneous interruption instruction is input to the input means.

18. The non-transitory computer-readable device storing the monitoring management program according to claim 17, wherein the monitoring management program causes the computer to further execute:

temporarily interrupting communication of a wireless device, other than the specified wireless device based on the instruction input to the input means before the simultaneous interruption instruction is input, among the plurality of wireless devices connected to the communication system.

19. The non-transitory computer-readable device storing the monitoring management program according to claim 18, wherein, the monitoring management program causes the computer to further execute:

when a communication path of the specified wireless device based on the instruction input to the input means has been established via another wireless device, temporarily interrupting communication of a wireless device other than the specified wireless device and the other wireless device.

20. The non-transitory computer-readable device storing the monitoring management program according to claim 17, wherein a priority has been set for each of the plurality of wireless devices, and the monitoring management program causes the computer to further execute: temporarily interrupting communication of a wireless device with a priority lower than a priority set based on the instruction input to the input means.

* * * * *